US007131630B2

(12) United States Patent
Adler et al.

(10) Patent No.: US 7,131,630 B2
(45) Date of Patent: Nov. 7, 2006

(54) ELECTROMAGNET

(75) Inventors: Bernhard Adler, Neu Ulm (DE); Horst Stegmaier, Ulm (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 0 days.

(21) Appl. No.: 10/540,289

(22) PCT Filed: Dec. 11, 2003

(86) PCT No.: PCT/EP03/14098

§ 371 (c)(1),
(2), (4) Date: Feb. 21, 2006

(87) PCT Pub. No.: WO2004/055392

PCT Pub. Date: Jul. 1, 2004

(65) Prior Publication Data

US 2006/0158289 A1 Jul. 20, 2006

(30) Foreign Application Priority Data

Dec. 18, 2002 (DE) ................................ 102 59 314

(51) Int. Cl.
*F16K 31/02* (2006.01)

(52) U.S. Cl. ........................... 251/129.01; 251/129.15; 123/625.65; 335/255; 335/278

(58) Field of Classification Search .................. 251/50, 251/51, 129.01–129.15; 335/255, 261, 278, 335/281; 123/625.65
See application file for complete search history.

(56) References Cited

U.S. PATENT DOCUMENTS 6,357,480 B1 3/2002 Oyama .................. 137/625.65

FOREIGN PATENT DOCUMENTS

| | | |
|---|---|---|
| DE | 37 09 474 C1 | 3/1988 |
| DE | 44 17 587 A1 | 11/1995 |
| DE | 197 17 807 A1 | 10/1998 |
| DE | 697 12 162 T2 | 4/2002 |
| WO | WO 97/12150 | 4/1997 |

*Primary Examiner*—Ramon M. Barrera
(74) *Attorney, Agent, or Firm*—Scully, Scott, Murphy & Presser, P.C.

(57) ABSTRACT

The invention relates to an electromagnet for actuating a valve. To this end, the electromagnet (28) comprises an armature (58), which can be axially displaced in an armature space (57, 77) and whose axial motion displaces a tappet (29) to the valve. The electromagnet is provided with reflux channel (71.1), which is connected to the armature space (57, 77) and via which the armature space (57, 77) is connected to a tank volume (25) in order to lead away a pressure medium leakage flow that is flowing out of the valve and into the armature space (57, 77).

5 Claims, 3 Drawing Sheets

ELECTROMAGNET

Figure 1A:
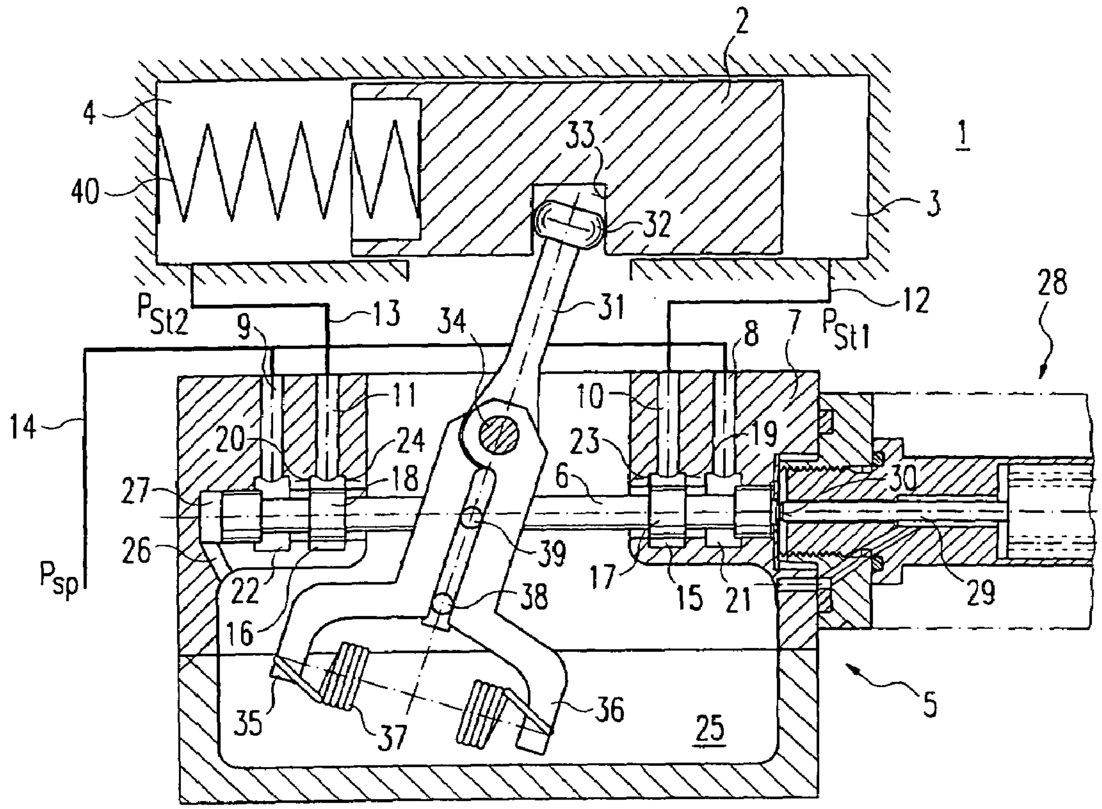

The invention relates to an electromagnet for actuating a valve.

Electromagnets are frequently used for actuating valves in hydraulic systems. Such an electromagnet for actuating a valve is, for example, known from DE 37 09 474 C1. In this connection, the electromagnet actuates a valve closing body which cooperates with a sealing seat depending on the stroke of the valve closing body with a variable throttle.

The stroke of the valve closing body is produced by an armature displaced in the axial direction by a magnetic field. To this end the armature can be displaced in the axial direction in an armature space and is held in a defined initial position by a spring acting axially on the armature. The hollow spaces formed in the interior of the electromagnet are filled with the pressure medium during the operation of the electromagnet, so that the motion of the armature is damped. The armature space or the pole tube defining the armature space in the axial direction is surrounded externally in the radial direction by a coil which produces a magnetic field when energised and which impinges on the armature with a magnetic force in the direction of the pole tube against the force of the spring.

The rear armature space is therefore reduced in its volume and the pressure medium present therein is displaced. At the same time, by the axial motion of the armature on the opposing face of the armature, a volume is produced into which the displaced pressure medium flows. The displaced pressure medium therefore flows along the radial external periphery of the armature, this annular gap being connected to the surroundings via a venting valve device.

The air therefore present in the armature space has to be removed from the armature space during the operation of the electromagnet. To this end, a venting valve device is provided in the electromagnet disclosed in DE 37 09 474 C1 which, via a transverse bore, connects the annular gap present around the armature to the surroundings of the electromagnet.

The venting valve device is constructed in a similar manner to a shuttle valve. The closing body arranged in the venting valve has a lower specific density than the pressure medium used. Due to the force of gravity, the closing body therefore opens up a flow-through cross-section until the level of the pressure medium flowing back along the valve closing body and which is forced into the armature space during the operation of the valve by the delivery pressure, has reached the closing body of the venting valve. The closing body then floats on the pressure medium and is forced against the sealing seat oriented outwardly, whereby the venting valve is closed.

In addition to the considerable cost in integrating such a shuttle valve in the electromagnet, the disclosed venting has the disadvantage that, during filling, the valve is closed by the pressure medium. In particular when the emptied armature space is repeatedly filled with the pressure medium, it is unavoidable that residual trapped air remains in the relatively viscous pressure medium in the rear armature space. This trapped air diminishes the damping behaviour and makes it difficult to adjust the damping, as the air can be distributed differently by the motion of the armature. The trapped air is simply pushed to and fro during the motion of the armature, but can no longer escape from the armature space, as the venting valve remains closed.

A further disadvantage is that the function of the valve is dependent on the positioning of the electromagnet. A hydraulic valve equipped with the disclosed venting valve therefore has a preset position.

A further disadvantage is that the venting hole is closed by the pressure medium which generally is an oil. With the partial escape of the pressure medium from the armature space, for example during a lengthy service life and as a consequence thereof, it can therefore lead to the closing body sticking, whereby the function is no longer guaranteed during further operation.

The object of the invention is to provide an electromagnet which is automatically and completely vented by continuous venting during operation.

The object is achieved by the electromagnet according to the invention with the features of claim 1.

The electromagnet according to the invention has the advantage that a reflux channel is connected to the armature space, via which the leakage fluid entering the armature space flows out into a tank volume. Thus during operation of the electromagnet a lower but continuously occurring leakage flow is achieved. On the one hand, this leakage flow produces a small vacuum in the armature space, on the other hand air bubbles which were conveyed into the region of the flow due to the motion of the armature, can be removed with the leakage flow via the reflux channel.

The reflux channel is always open during the operation of the electromagnet so that even when the electromagnet is almost completely filled with the pressure medium, the pressure medium leakage flow is maintained. In this manner it is possible that trapped air, which can still be present in the rear armature space when almost completely filled with pressure medium, is still removed from the interior of the electromagnet. The trapped air is then conveyed by the motion of the armature into the region in which the flow emerges due to the pressure medium leakage. On the one hand, the motion of the trapped air is thus favoured by the vacuum produced by the flow and, on the other hand, by the turbulence which is produced due to the flow.

Advantageous developments of the electromagnet according to the invention are shown in the sub-claims.

It is advantageous, in particular, that the reflux channel directly discharges into the armature space, as thereby particularly effective venting results. The pressure medium displaced from the rear armature space by the motion of the armature thus transports the air bubbles retained in the rear armature space into the immediate vicinity of the leakage flow. Thus the air bubbles are carried away by the leakage flow particularly easily and rapid venting results.

A further advantageous embodiment is produced by the reflux channel being arranged in an expanded region of the pole tube. By such an arrangement the leakage flow is not guided through the armature space, whereby the risk is reduced that particles of dirt which can be retained in the leakage flow are transported as far as the armature. Such contamination which is present in the region of the armature, has a detrimental effect on the life of the electromagnet. Relative to the discharge of the reflux channel directly into the armature space, a higher flow rate of the leakage flow is created during discharge into the pole tube, due to the smaller flow cross-sections, which flow rate in turn improves the escape of trapped air bubbles.

Moreover, it is advantageous to construct the reflux channel in the electromagnet, such that it is possible to connect it directly to the tank volume located in the actuated valve unit. According to an advantageous development of the electromagnet according to the invention, to this end the reflux channel is located in a pole tube which also undertakes the guiding of the tappet acting on the valve to be actuated.

Figure 1B:
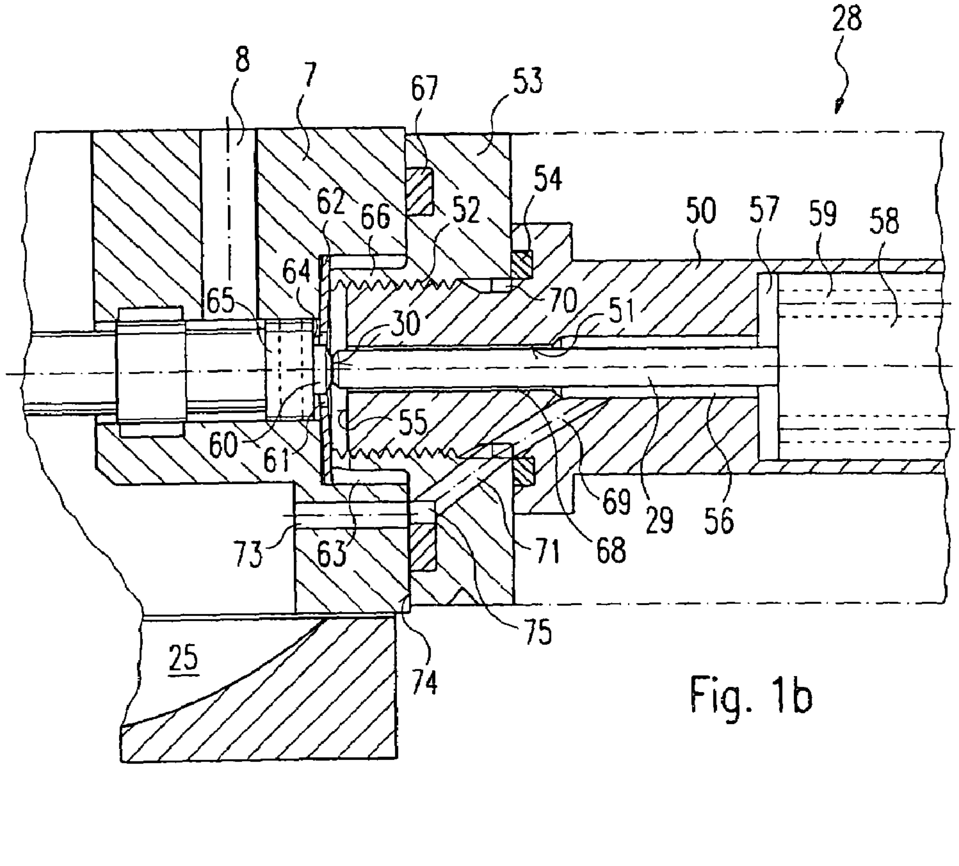
Figure 2:
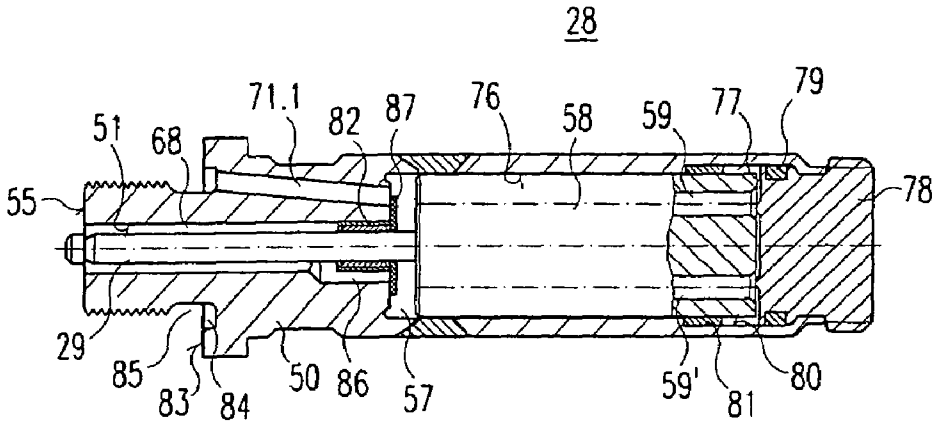
Figure 3:
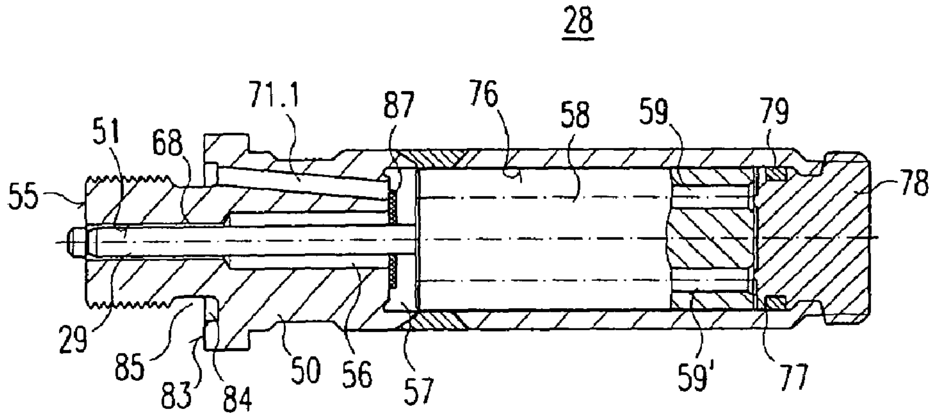
Figure 4:
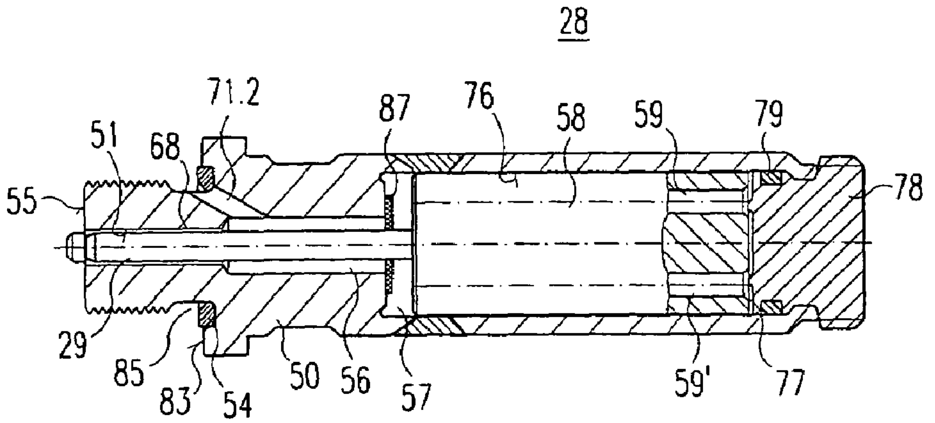
Figure 5:
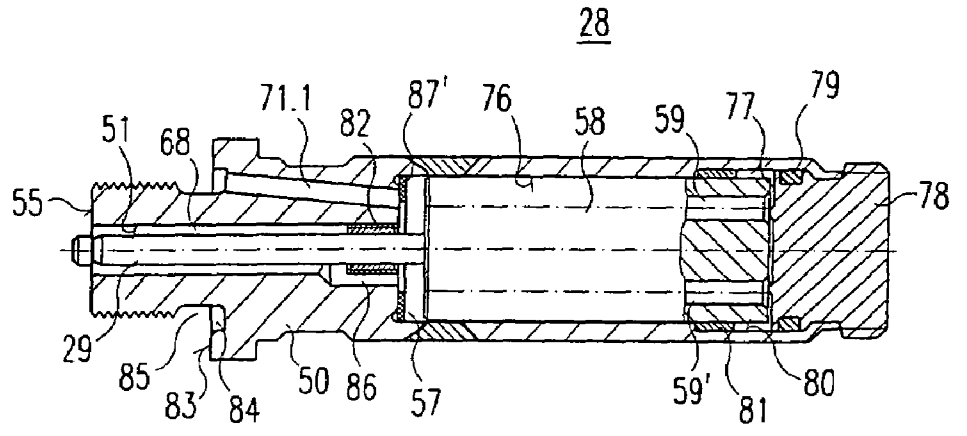
Figure 6:
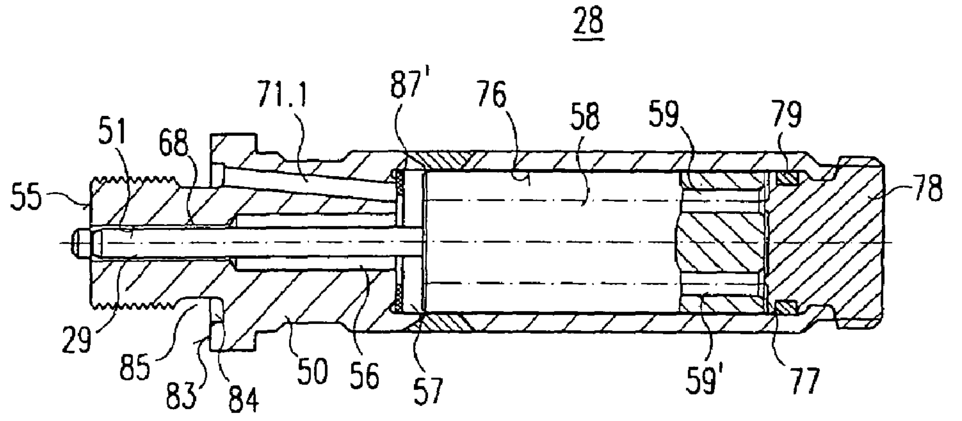
Figure 7:
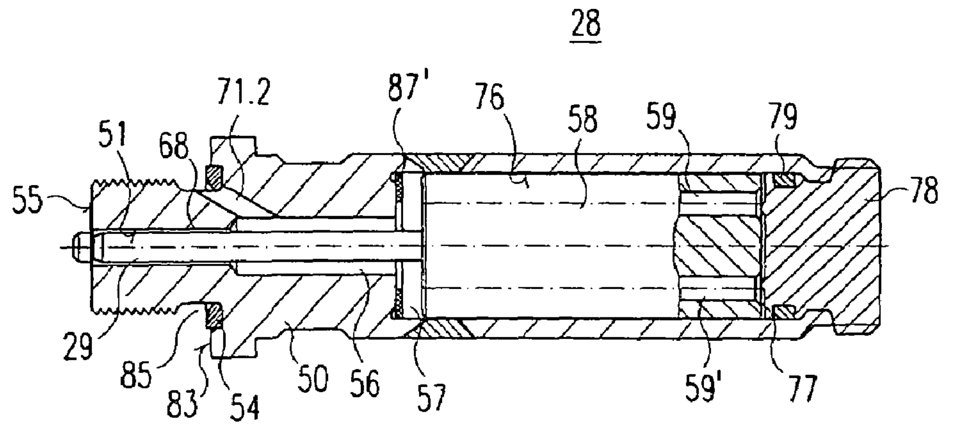

Advantageous embodiments of the electromagnet according to the invention are described in more detail with reference to the following description and shown in the drawings, in which:

FIG. 1*a* is a diagrammatic sectional view of a valve unit actuated by an electromagnet according to the invention, FIG. 1*b* is an enlarged view of a portion of FIG. 1*a*, FIG. 2 is a sectional partial view of a first embodiment of an electromagnet according to the invention, FIG. 3 is a sectional partial view of a second embodiment of an electromagnet according to the invention, FIG. 4 is a partial sectional view of a third embodiment of an electromagnet according to the invention, FIG. 5 is a partial sectional view of a fourth embodiment of an electromagnet according to the invention, FIG. 6 is a partial sectional view of a fifth embodiment of an electromagnet according to the invention, FIG. 7 is a partial sectional view of a sixth embodiment of an electromagnet according to the invention.

A first example of an actuating device 1 with a valve actuated by the electromagnet according to the invention is shown in FIG. 1*a*. To regulate a pivot angle of a hydrostatic piston machine not shown, an actuating piston 2 is impinged upon by actuating pressure in an actuating pressure chamber 3 and a second actuating pressure chamber 4. The actuating pressures acting in the first and second actuating pressure chambers 3 and 4 act on the opposingly oriented piston faces of the actuating piston 2, on which, in the event of a pressure difference, a resulting force is applied. To set the pressure difference in the two actuating pressure chambers 3 and 4 an actuating pressure regulating valve 5 is provided. The actuating pressure regulating valve 5 comprises a regulating piston 6 which is axially displaceably arranged in a bore of a housing 7. Furthermore, a first feed pressure bore 8 and second feed pressure bore 9 are introduced in the housing 7. The first feed pressure bore 8 and second feed pressure bore 9 are connected to a feed pressure line 14 which, for example, can be attached to an auxiliary pressure source.

To set the actuating pressures in the first actuating pressure chamber 3 and the second actuating pressure chamber 4, the feed pressure line 14 and the first feed pressure bore 8 or the second feed pressure bore 9 can be connected to a first actuating pressure line 12 or a second actuating pressure line 13. To this end, the first actuating pressure line 12 is attached to a first actuating pressure channel 10 which flows into a first groove 15 on the side of the regulating piston 6. The second actuating pressure line 13 is also connected via a second actuating pressure channel 11 to a second groove 16. In the region of the first and second groove 15 and 16 respectively, the regulating piston 6 comprises a first regulating piston portion 17 and a second regulating piston portion 18. The two regulating piston portions 17 and 18 comprise a first actuating pressure control edge 19 and a second actuating pressure control edge 20 respectively which are arranged on the opposingly oriented ends of the respective regulating piston portion 17 and 18. The first actuating pressure control edge 19 and the second actuating pressure control edge 20 form with the respective first groove 15 and second groove 16 a variable throttle position depending on the axial position of the regulating piston 6. By the common motion of the two control edges 19 and 20 a respective throttle is thus opened and at the same time the other throttle closed.

Depending on the direction of motion of the regulating piston 6, the first actuating pressure channel 10 is therefore connected to a first feed pressure groove 21 via the first groove 15 and thus the first actuating pressure chamber 3 is pressurised by the pressure from the feed pressure line 14. Similarly, the second actuating pressure channel 11 is connected to a second feed pressure groove 22 via the second groove 16, when the regulating piston 6 is displaced in the opposing direction.

On the side facing away from the first actuating pressure control edge 19 of the first regulating piston portion 17 a first relieving control edge 23 is arranged. Similarly, on the second regulating piston portion 18 a second relieving control edge 24 is arranged. Depending on the axial position of the regulating piston 6 the respective actuating pressure chamber 3 and 4 is expanded into a tank volume 25 via the two relieving control edges 23 and 24 respectively and via the first groove 15 and the second groove 16 respectively.

The rear regulating piston space 27 is also connected to the tank volume 25 via a volume equalisation channel 26. The slight volume fluctuations which occur in the rear regulating piston space 27 by an axial motion of the regulating piston 6 are thus equalised. Furthermore, a portion of the regulating piston leakage is removed via the volume equalisation channel 26 into the tank volume 25.

In order to displace the actuating piston 2 into its second end position, a proportional magnet 28 is provided which is arranged on the housing 7 of the regulating valve 5. The proportional magnet 28 comprises a tappet 29, the tappet 29 acting on a front face 30 of the regulating piston 6. Thus a control force can be transmitted to the regulating piston 6 in the axial direction and which is produced by the proportional magnet 28 depending on a control signal which is supplied to the proportional magnet 28 via an electrical connection not shown. If such a control signal is supplied to the proportional magnet 28 via the electrical connection, it creates a force which displaces the regulating piston 6. In this connection a through-flow gap is produced by the axial motion of the regulating piston 6 on the first actuating pressure control edge 19. The pressure medium supplied via the feed pressure line 14 and the first feed pressure bore 8 can enter the first actuating pressure chamber 3 via the first actuating pressure channel 10. The pressure increased therefore in the first actuating pressure chamber 3 causes a displacement of the actuating piston 2 counter to the force of a return spring 40 in the direction of its second end position.

Simultaneously with the opening of the throttle position on the first actuating pressure control edge 19 the throttle position of the second relieving control edge 24 is opened in the second regulating piston portion 18. The second actuating pressure chamber 4 is expanded via the second actuating pressure line 13 and the second actuating pressure channel 11 into the tank volume 25.

A driver recess 33 is provided in the actuating piston 2 for the feedback of the actuating motion of the actuating piston 2, in which a driving head 32 is arranged which is connected to the actuating lever 31. The actuating lever 31 is rotatably mounted on a bearing bolt 34, so that the actuating motion of the actuating piston 2 leads to a rotation of the actuating lever 31. Also rotatably mounted on the bearing bolt 34 are a first arm 35 and a second arm 36. The first arm 35 and the second arm 36 are connected to one another via a tension spring 37, so that a deflection of one of the two arms relative to the other leads to a tensioning of the tension spring 37.

A driving pin 38 is arranged on the end of the actuating lever 31 opposing the driving head 32 of the actuating lever 31. When the actuating piston 2 is moved and during a rotational movement of the actuating lever 31 connected thereto, the driving pin 38 moves counter to the actuating piston motion. The driving pin 38 rests on the second arm 36, so that by the rotational movement of the actuating lever 31 the second arm 36 is deflected relative to the first arm 35 and the spring 37 is tensioned.

The regulating device 1 shown in FIG. 1*a* is actuated by a force being exerted via the proportional magnet 28 on the regulating piston 6. This cooperation is described with reference to FIG. 1*b*. To this end, the proportional magnet 28 comprises a pole tube 50 surrounded by a coil, not shown, and which is penetrated along its longitudinal axis by a through passage 51. The diameter of the through passage 51 is such that the through passage 51 forms a leakage gap with the tappet 29. The pole tube 50 is fastened in a housing cover 53 of the proportional magnet 28 by means of a screw connection 52. To seal the pole tube 50 relative to the housing cover 53 a sealing element 54 is arranged in a groove of the pole tube 50 provided therefor.

The tappet 29 slightly protrudes beyond the front face 55 of the pole tube 50 and rests at that point on the front face 30 of the regulating piston 6. On the face facing away from the front face 55 of the pole tube 50 the through passage 51 comprises a radially expanded portion 56 to which an armature space 57 is attached and configured in the embodiment shown as a recess of the pole tube 50. In the armature space 57, an armature 58 is arranged which cooperates with the tappet 29. In the armature 58, parallel to its longitudinal axis, armature channels 59 are constructed which connect to one another the two front faces of the armature 58 facing away from one another.

By energising the coil elements, not shown, of the electromagnet the armature 58 is impinged upon by the resulting magnetic field with a force in the axial direction which displaces it such that the volume of the armature space 57 is reduced. As the armature 58 cooperates with the tappet 29, this axial motion is transmitted to the tappet 29 which for its part transmits the axial motion in turn to the front face 30 of the regulating piston 6. If the current for the coil elements is switched off, a force no longer acts upon the armature 58 and it is displaced to the right via the counter force transmitted by the regulating piston 6 to the tappet 29, in the arrangement shown in FIG. 1*b*. Between the armature space 57 and the rear armature space not shown in FIG. 1*b*, there is therefore a connection via the armature channels 59, so that between the armature space 57 and the rear armature space a volume equalisation takes place.

The front face 30 of the regulating piston 6 is constructed on a projection 60. The projection 60 penetrates an aperture 61 of a spring washer 62 which is arranged in a receiving aperture 63 of the housing 7. The spring washer 62 is arranged in the receiving aperture 63, such that the regulating piston 6 pushed back by the counter force abuts said spring washer with an abutment surface 64 and undergoes a defined braking force at that point. The abutment surface 64 is thus constructed on a guide portion 65.

The housing cover 53 comprises a cylindrical projection 66 which protrudes into the receiving aperture 63 of the housing 7. The spring washer 62 can, for example, be fixed in the receiving aperture 63 via the cylindrical projection 66. A further sealing element 67 for sealing is arranged in a groove of the housing cover 53, which seals the proportional magnet 28 relative to the housing 7.

Between the guide portion 65 of the regulating piston 6 and the housing 7 a pressure medium leak is formed, through which a pressure medium flows from the feed pressure bore 8 past the guide portion 65 in the direction of the proportional magnet 28. The pressure medium firstly fills the receiving aperture 63 and then also flows through a gap 68 which is constructed in the through passage 51 between the inner wall of the pole tube 50 and the tappet 29 arranged therein. The armature space 57 forms a closed volume.

In order to create a possibility of discharging the pressure medium flowing in and thus to create the required flow for venting, a first channel portion 69 of a reflux channel is provided in the pole tube 50 and which connects the expanded region 56 of the through passage 51 to a peripheral channel 70. The peripheral channel can, for example, be designed as an undercut in the run-out region of the screw connection 52. The pressure medium flowing back flows via a second channel-portion 71 of the reflux channel and a third channel portion 73 back into the tank volume 25.

The second channel portion 71 of the reflux channel discharges at a front face 74 oriented in the direction of the cylindrical projection 66. In the embodiment shown, a recess 75 is arranged in the front face 74 of the housing cover 53. The recess 75 thus lies in a radial inner region relative to the second sealing element 67 and can, in order to compensate for inaccuracies in assembly, extend over a larger surface of the front face 74. The hollow space made by the recess 75 is connected to the tank volume 25 via the third portion 73. The third portion 73 is thus constructed as a bore through a wall of the housing 7.

In FIG. 2 a portion of an electromagnet 28 according to the invention is shown. The pole tube 50 comprises a recess 76 for the armature 58. According to the position of the armature 58 in the axial direction, an armature space 57 is formed in the pole tube 50 as is shown in FIG. 2, or a rear armature space 77 of which the volume is minimal in the position of the armature 58 shown. The rear armature space 77 is defined in the radial direction by the pole tube 50. In the axial direction the rear armature space 77 is defined, on the one hand, by the armature 58 and on the other hand by a closure piece 78, the closure piece 78 closing the pole tube 50 on its face facing away from the front face 55. The closure piece 78 is sealed with a further sealing element 79 relative to the inner wall of the pole tube 50.

The armature space 57 and the rear armature space 77 are connected to one another via armature channels 59 and 59'. When the armature 58 moves, the pressure medium present in the rear armature space 77 can therefore flow into the armature space 57 and vice versa. In a radially expanded region 80 of the recess 76 a friction bearing 81 is arranged in which the armature 58 is guided. A second friction bearing 82 is arranged in the through passage 51. The second friction bearing 82 is thus arranged on the end of the through passage 51 oriented toward the armature space 57 and at that point guides the tappet 29 which is connected to the armature 58.

In the embodiment shown, the through passage 51 is constructed with a uniform diameter over its entire length as far as the armature space 57. In order not to offer too great a flow resistance to the pressure medium leak, the gap 68 which is constructed between the tappet 29 and the inner wall of the through passage 51 is enlarged relative to the through passage of FIG. 1*b*. The pole tube 50 comprises an abutment surface 83 in which a groove 84 is constructed for receiving the first sealing element. The sealing element provided to insert into the groove 84 leaves a through-flow gap open which connects an undercut 85 with the first channel portion 71.1 In the embodiment of FIG. 1*b*, it has already been disclosed that the undercut 85 forms a peripheral channel 70 in the region of a run-out of the screw connection 52.

The first channel portion 71.1 connects the armature space 57 to the abutment surface 83 and thus allows the back-flow of the pressure medium flowing into the armature space 57 via the gap 68. In order to create a through-flow connection also between the gap 68 and the armature space 57, an overflow channel 86 is provided which widens the through passage 51 in the radial direction on its face facing toward the armature space 57, such that the pressure medium can flow past the second friction bearing 82 into the armature space 57.

On the surface of the pole tube 50 defining the armature space 57 in the direction of the front face 55, an anti-adhesive plate 87 is fastened which prevents undesired magnetic sticking of the armature 58. To this end, the anti-adhesive plate 87 is made from non-magnetic material and in the embodiment of FIG. 2 centred on its inner diameter and bonded to the surface of the pole tube 50.

The flow path of the pressure medium through the proportional magnet 28 travels via the gap 68, via which the pressure medium, which due to the feed pressure has flowed past the guide portion 65 of the regulating piston 6, has entered the electromagnet 28. The pressure medium flows further out of the gap 68 via the overflow channel 86 as far as the armature space 57. In order to allow a connection from the overflow channel 86 into the armature space 57 it is, for example, possible to provide corresponding recesses in the anti-adhesive plate 87. The pressure medium flows out of the armature space 57 along the first channel portion 71.1 in the direction of the tank volume 25 via the second channel portion 71 and the third channel portion 73.

An embodiment is shown in FIG. 3 in which, in place of the first friction bearing 81 and the second friction bearing 82, foil bearings are used. Furthermore, the radially expanded region 56 of the through passage 51, disclosed above in FIG. 1*b*, is constructed in place of the overflow channel 86. The flow path of the pressure medium substantially corresponds to the flow path disclosed in FIG. 2. The pressure medium leakage flow travels through the armature space 57, so that the air bubbles present in the armature space 57 are carried away very efficiently. The air bubbles are conveyed from the rear armature space 77 by the motion of the armature 58 when the proportional magnet 28 is actuated. Thus the venting can take place during the operation of the proportional magnet 28 and, due to the continuous venting during operation, is complete. Venting to be carried out initially by means of an additionally required bleed screw can thus be dispensed with.

A further embodiment is shown in FIG. 4, in which a first channel portion 71.2 is constructed which leads from the undercut 85 into the expanded region 56 of the through passage 51. The discharging of the first channel portion 71.2 into the expanded region 56 of the through passage 51 has the advantage that the pressure medium leakage flow does not travel through the armature space 57. Thus by the pressure medium flowing through the electromagnet 28, no contamination is conveyed into the region of the armature 58. By means of the short link via the expanded region 56 an increase in the life of the proportional magnet 28 is therefore achieved.

The embodiments of FIGS. 5 to 7 substantially correspond to the embodiments of FIGS. 2 to 4. In contrast thereto, however, an anti-adhesive plate 87' is used which is centred on its outer periphery. The anti-adhesive plate 87' comprises a central recess, like the anti-adhesive disc 87 of the embodiments of FIGS. 2 to 4 and which in this connection, however, is so large in its radial expansion that the first channel portion 71.1 is connected via the central recess to the armature space 57.

The proposed venting is not restricted to use in a proportional magnet, as it is used in the embodiments, but can also be used in switching magnets or thrust-type solenoids. The reflux channel can moreover also be connected to the rear armature space 77.

The invention claimed is:

1. Electromagnet for actuating a valve, the electromagnet comprising an armature which can be axially displaced in an armature space and of which the axial motion displaces a tappet to the valve and a reflux channel connected to the armature space being provided, via which the armature space is connected to a tank volume for removing a pressure medium leakage flow that is flowing out of the valve into the armature space, wherein at least one first channel portion of the reflux channel is arranged in a pole tube and in that a second channel portion (71) of the reflux channel is provided in a housing cover and which discharges from the housing cover on a surface provided for abutment against a valve housing.

2. Electromagnet according to claim 1, wherein the reflux channel discharges in a radially expanded portion of a through passage connected to the armature space.

3. Electromagnet according to claim 1, wherein the reflux channel discharges directly into the armature space.

4. Electromagnet according to claim 1, wherein a rear armature space constructed on the side of the armature facing away from the tappet is connected to the armature space by means of at least one armature channel.

5. Electromagnet according to claim 1, wherein the tank volume connected to the armature space via the reflux channel is a tank volume constructed in the valve.

* * * * *